June 17, 1947.    J. A. BALL    2,422,387
ADHESIVE TEMPORARY SUPPORT
Filed March 15, 1943
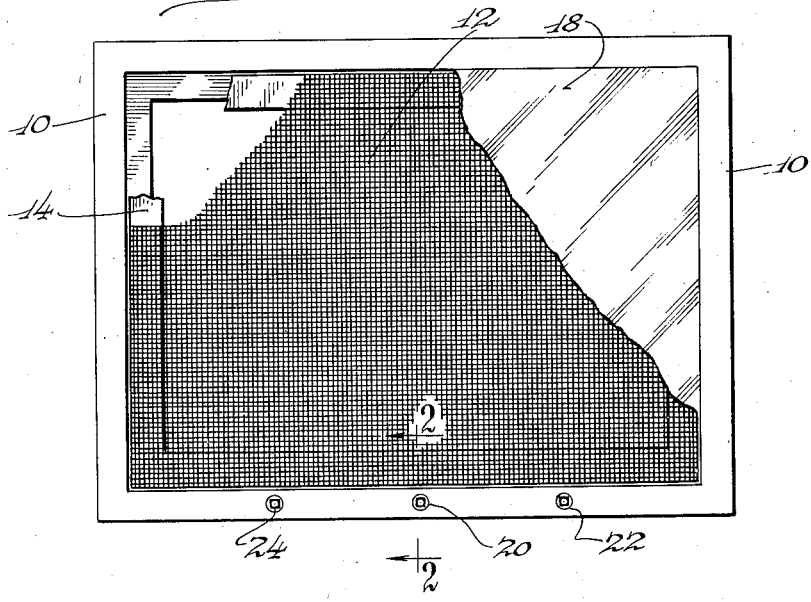
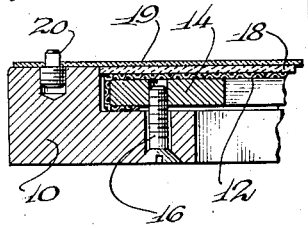
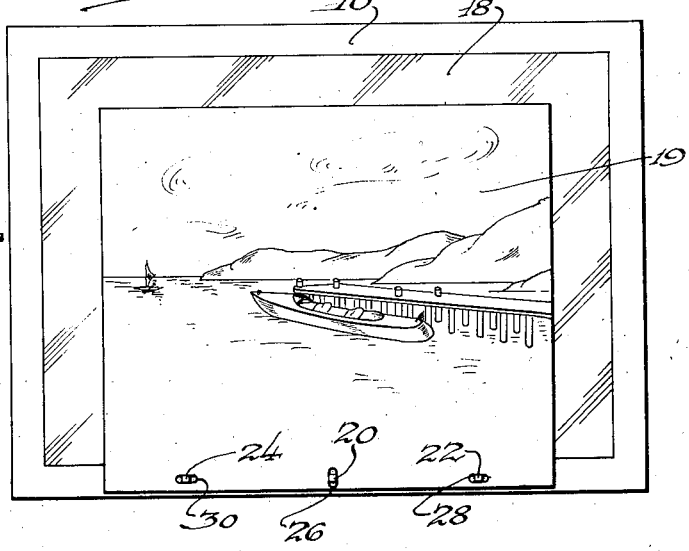
Inventor:
Joseph Arthur Ball
By Williams, Bradbury & Hinkle
Attorneys

Patented June 17, 1947

2,422,387

UNITED STATES PATENT OFFICE 2,422,387

ADHESIVE TEMPORARY SUPPORT

Joseph Arthur Ball, Los Angeles, Calif., assignor to Max McGraw, doing business as McGraw Colorgraph Company, Burbank, Calif.

Application March 15, 1943, Serial No. 479,212

1 Claim. (Cl. 41—33)

The present invention relates to adhesive temporary supports, particularly those used in performing color print or similar processes.

The present invention is illustrated and described hereafter as applied to the provision of a temporary support for use in performing carbon or carbro type color photographic processes. In performing a carbon type process, for example, at one point in the procedure, several relief color images made up of pigmented hardened gelatin are obtained on several sheets of transparent plastic material. As the method is usually performed, these three images will be colored yellow, blue-green and magenta. In order to form the final print, it is necessary that these three images be registered and superposed upon a white support surface. This operation is normally accomplished with the assistance of an intermediate transfer medium comprised of a sheet of pliable water-pervious paper coated with soft gelatin. A sheet of this type is usually referred to as a temporary support.

Transference is accomplished by soaking one of the image-bearing Celluloid sheets and the temporary support in cold water. The face of the Celluloid sheet having the image thereon is then applied to the soft gelatin surface of the temporary support paper, and the two sheets are squeegeed together and set aside to dry. When dry, the soft gelatin of the temporary support forms a firm bond with the hardened gelatin image on the plastic sheet. Since the bond between the hard and soft gelatin is considerably stronger than the bond between the gelatin surfaces and the plastic sheet, the plastic sheet can be peeled away, thus leaving the hardened gelatin image bonded to the soft gelatin of the temporary support.

The temporary support is then soaked in water, as is another of the plastic sheets, and the image-bearing face of the second plastic sheet is then applied to the gelatin surface of the temporary support with the image upon the plastic sheet in register with the image in place upon the temporary support. Inasmuch as the temporary support must be successively soaked in water and dried, it successively swells and shrinks. Usually this shrinkage takes place differentially and is somewhat unpredictable even though the temporary support paper is made with great care. It is therefore a difficult and painstaking operation to register the gelatin image on the second plastic sheet with the gelatin image on the temporary support. Registration is frequently accomplished by a highly skilled operator differentially stretching the temporary support paper so as to make the image thereon coincide with the image on the plastic sheet, the operator observing his work by looking through the transparent sheet. When the two images have been brought into register, the sheets are squeegeed together and set aside to dry, after which the second plastic sheet is peeled away.

The temporary support and the third plastic sheet are then soaked in water, and the image on the third plastic sheet is applied to the two images on the temporary support paper in the manner above described for applying the second image to the temporary support.

At this point in the process the operator provides a permanent support for the image. This permanent support may comprise a piece of paper board, a sheet of textile material, a sheet of opaque white plastic, or other substance having a flat surface which has been coated with a layer of hardened gelatin. This permanent support and the temporary support with the three images thereon are then soaked in cold water. The wet gelatin surface of the temporary support is then applied to the wet gelatin surface of the permanent support, and the two sheets are squeegeed together and partially dried in a press between sheets of blotting paper to bring about a firm bond between the two gelatin surfaces. The permanent support is then washed in hot water to dissolve the soft gelatin of the temporary support, permitting the paper backing of the temporary support to be washed away. Thus, the hardened gelatin image, which is not soluble in hot water, remains upon the permanent support. After sufficient additional washings in hot water to remove all of the soft gelatin, the permanent support with the three hardened images thereon is set aside to dry, thereby completing the process.

From the above it is apparent that the temporary support must be repeatedly soaked in water and dried. Inasmuch as it is dried with its gelatin-coated face against a sheet of water impervious transparent plastic material, the water in the assembly must be evaporated from the back surface of the temporary support. Necessary attributes of such a support, therefore, are that it be water permeable and that it have a smooth transfer surface. All prior temporary supports with which I am familiar that have these characteristics, swell when soaked in water, and shrink when they are subsequently dried. For this reason mechanical schemes for registering images upon temporary supports by mechanically locating each of the several plastic sheets at the time it is applied to the support, are not feasible, excepting when making pictures in relatively small sizes where shrinkage and expansion are not sufficient to produce objectionable lack of register.

It is therefore the principal object of the present invention to provide a novel and superior temporary support adapted to be used in place of prior used temporary supports.

An additional object of the present invention is to provide an improved adhesive temporary support to be substituted in place of what is commonly termed temporary support paper in performing such color print processes as carbon and carbro.

Yet another object of the present invention is to provide an improved temporary support which may be used in performing color photographic processes such as the carbon and carbro processes, and through the use of which such processes are well adapted to be carried out in conjunction with mechanical registration schemes.

Yet another object of the present invention is to provide a smooth surfaced, water permeable temporary adhesive support which will not change dimensions with repeated wettings and dryings.

An additional object of the present invention is to provide an improved water permeable temporary support adapted to serve as a medium upon which a plurality of hardened gelatin images can be assembled from a plurality of individual image-supporting sheets and from which the assembled images can be transferred to a permanent mount.

Other objects and advantages will become apparent from the following description of a preferred embodiment of my invention illustrated in the accompanying drawings, in which similar characters of reference refer to similar parts throughout the several views.

In the drawings:

Fig. 1 is a plan view of a temporary support embodying the present invention, with portions thereof broken away better to illustrate the structure;

Fig. 2 is a vertical sectional view taken in the direction of the arrows along the line 2—2 of Fig. 1; and Fig. 3 is a plan view of the temporary support showing a sheet of plastic material with a hardened gelatin image thereon lying upon the surface of the support.

The temporary support shown in the drawings is made up of a rectangular frame 10 constructed much in the manner of a picture frame excepting that it is preferably formed of metal so that it cannot swell, shrink or become distorted with repeated wettings and dryings. To prevent corrosion, this frame preferably should be formed of stainless steel or some like corrosion resistant metal. The opening in this frame is covered with a fine mesh metal screen 12, preferably formed of stainless steel so as to resist corrosion. It has been found that commercially available 230 mesh stainless steel screen adequately serves the purpose.

As shown in Fig. 2 of the drawings, the wire screen is stretched over and clamped to a rectangular sub-frame 14 which fits into a rabbeted edge in the main frame 10, the sub-frame being secured in place by screws 16 passed upwardly through the main frame 10, their upper ends being threaded into tapped openings in the sub-frame 14. Such a screen presents a plane surface and is rigidly supported in the frame 10 so that the device can be handled as an integral unit.

This support is prepared for use by dissolving soft gelatin in hot water and flowing this solution over the upper surface of the screen 12. The gelatin forms a firm bond with the screen, but bridges across the small screen openings. The gelatin while still soft quickly levels itself and provides a plane, smooth upper surface. After the screen has cooled and the gelatin has solidified, the support is ready for use.

A screen as thus prepared has the same surface qualities as a sheet of temporary support paper. Also, water can be evaporated from its back, the water passing through the interstices of the screen, but since the screen is tightly stretched in place within the rigid frame, the image-supporting surface cannot shrink, expand or distort with repeated wettings and dryings.

To use the above described screen, a plastic sheet bearing a hardened gelatin image and the temporary support coated with soft gelatin are soaked in water. The surface of the plastic sheet bearing the image is then applied to the surface of the soft gelatin, a squeegee being passed over the sheet to bring about good continuous contact between the plastic sheet and the gelatin surface 18. The temporary support is then set aside to dry, the water being evaporated through the back surface of the gelatin 18. After the assembly has dried, the plastic sheet is peeled away in the same manner that such a sheet is peeled from a sheet of ordinary temporary support paper.

The temporary support and the second plastic sheet bearing the second image are then soaked in water, and the second image is applied to the first by squeegeeing the second plastic sheet to the gelatin surface 18. After the assembly has again dried and the plastic sheet has been peeled away, the third image is applied to the temporary support in the same manner.

After all of the images repose upon the temporary support, these images are transferred to a permanent support. The permanent support is usually constructed in the manner previously described; that is, it is comprised of a sheet of white paper, opaque plastic, fabric or the like, coated with hard gelatin. Such a permanent support and the temporary support are soaked in water, and the permanent support is arranged with its gelatin surface in contact with the gelatin surface of the temporary support. The surfaces are then squeegeed together to bring about a good bond between the hardened gelatin of the permanent support and the image upon the temporary support. The assembly is then washed in hot water, the water being directed principally against the back of the temporary support so as to liquify the soft gelatin adhering to the screen. The hot water washes away the soft gelatin, thereby freeing the permanent support with the image thereon from the temporary support. After the supports have been separated, the permanent support is additionally washed in hot water to remove all of the soft gelatin from its surface. It is then set aside to dry to produce the final print. The washing action having removed the soft gelatin from the screen of the temporary support, an additional quantity of soft gelatin is dissolved in hot water, and the solution is poured over the screen, in the manner previously described, to form a new smooth adhesive surface upon which a successive set of color images may be assembled.

Inasmuch as the temporary support forming the subject of the present invention cannot shrink or expand, mechanical registration of the plastic sheets 19 relative to the temporary support surface is feasible and of considerable advantage. One such mechanical registration scheme is shown, and comprises a centrally located, substantially square pin 20 secured in the frame 10 at substantially its mid-point along the lower margin of the screen 12. A second similar pin 22 is located somewhat to the right of the pin 20, while a third pin 24 is similarly located somewhat to the left of the central pin 20. These pins are rigidly secured to the frame 10 and project upwardly therefrom. Each plastic sheet to be registered upon the temporary support is provided with a vertical slot 26 centrally located along its lower margin, adapted to fit the pin 20 from side to side. This pin prevents the sheet 19 from shifting from side to side. It does not, however, prevent movement of the sheet in a vertical direction. A horizontally extending perforation 28 is arranged to the right of the perforation 26 and is adapted to fit the pin 22 from top to bottom. It does not prevent horizontal movement of the sheet, however. A similar slot 30 is arranged to the right of the center slot 26 and is adapted to fit the pin 24 closely from top to bottom but loosely from side to side.

Through the use of the above described registering arrangement, the pins 22 and 24, in conjunction with the slots 28 and 30, prevent vertical movement of the sheet and also prevent rotation of the sheet, while the pin 20 in conjunction with the slot 26 prevents horizontal movement of the sheet. The sheet therefore can lie upon the gelatin surface of the support in only one position.

Thus, if the color images are properly registered upon the plastic sheets 19, these images will be properly registered when transferred to the temporary support.

It will be appreciated that other mechanical arrangements can be used for registering the plastic sheets relative to the temporary support. It is also apparent that any one of several schemes may be used for insuring all of the images being located in the same positions upon their plastic sheets 19.

Having thus described my invention, what I claim as new and useful and desire to secure by Letters Patent of the United States is:

In a device of the type described, the combination comprising a layer of soft gelatin supported upon a tightly stretched wire mesh screen and a hardened gelatin image adhesively secured to the surface of said soft gelatin layer, said hardened gelatin image adapted to be released by dissolving the soft gelatin in hot water.

JOSEPH ARTHUR BALL.

REFERENCES CITED

The following references are of record in the file of this patent:

UNITED STATES PATENTS

| Number | Name | Date |
|---|---|---|
| 1,675,561 | Keel | July 3, 1928 |
| 770,421 | Derepas | Sept. 20, 1904 |
| 2,273,694 | Tuukkanen | Feb. 17, 1942 |
| 2,250,377 | Higgins | July 22, 1941 |
| 741,746 | Walker | Oct. 20, 1903 |
| 1,231,727 | Gaumont | July 3, 1917 |
| 1,650,132 | Jones | Nov. 22, 1927 |
| 2,029,077 | Lejeune | Jan. 28, 1936 |
| 2,064,764 | Playford et al. | Dec. 15, 1936 |